(12) United States Patent
Sung et al.

(10) Patent No.: US 8,891,530 B2
(45) Date of Patent: Nov. 18, 2014

(54) MULTI-FA PERSONAL SUBSCRIBER TERMINAL AND METHOD OF ORDERING PROTOCOL DATA UNIT THEREOF

(75) Inventors: Nak Woon Sung, Daejeon (KR); Kyung Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 454 days.

(21) Appl. No.: 12/808,290

(22) PCT Filed: Aug. 21, 2008

(86) PCT No.: PCT/KR2008/004890
§ 371 (c)(1),
(2), (4) Date: Jun. 15, 2010

(87) PCT Pub. No.: WO2009/078537
PCT Pub. Date: Jun. 25, 2009

(65) Prior Publication Data
US 2010/0260111 A1 Oct. 14, 2010

(30) Foreign Application Priority Data
Dec. 18, 2007 (KR) .......................... 10-2007-0133658

(51) Int. Cl.
*H04L 12/28* (2006.01)
*H04L 29/06* (2006.01)
*H04W 28/06* (2009.01)
*H04W 80/06* (2009.01)
*H04L 1/16* (2006.01)

(52) U.S. Cl.
CPC ............. *H04L 69/14* (2013.01); *H04W 28/065* (2013.01); *H04W 80/06* (2013.01); *H04L 1/1635* (2013.01)

USPC .......................................................... 370/394

(58) Field of Classification Search
None
See application file for complete search history.

(56) References Cited

U.S. PATENT DOCUMENTS

| 2002/0095512 | A1 | 7/2002 | Rana et al. |
| 2006/0262811 | A1 | 11/2006 | Jiang |
| 2007/0162813 | A1* | 7/2007 | Nakashima ................... 714/749 |
| 2007/0206600 | A1 | 9/2007 | Klimker et al. |

(Continued)

FOREIGN PATENT DOCUMENTS

| CN | 1866971 A | 11/2006 |
| CN | 1939010 A | 3/2007 |

(Continued)

OTHER PUBLICATIONS

Nak Woon Sung, Improving TCP Performance Using PDU Reordering in WiBro Multi FA Access Terminal, IT ACT2008, Feb. 19, 2008.

(Continued)

*Primary Examiner* — Jianye Wu
(74) *Attorney, Agent, or Firm* — Jefferson IP Law, LLP

(57) ABSTRACT

A multi-FA personal subscriber station and a method of ordering protocol data units thereof is provided. The present invention allows for simultaneously accessing two frequency channels to transmit and receive data and appropriately ordering protocol data units transmitted through each frequency channel, thereby minimizing errors in TCP/IP packet transmission. According to the present invention, two frequency channels are simultaneously accessed to transmit and receive data and protocol data units transmitted through each of the frequency channels are ordered, thereby minimizing errors in TCP/IP packet transmission.

6 Claims, 12 Drawing Sheets

(56) References Cited

U.S. PATENT DOCUMENTS

| | | |
|---|---|---|
| 2008/0192719 A1 | 8/2008 | So et al. |
| 2009/0046626 A1 | 2/2009 | Shao et al. |
| 2009/0144441 A1* | 6/2009 | LoGalbo et al. ............ 709/235 |

FOREIGN PATENT DOCUMENTS

| | | |
|---|---|---|
| EP | 1 993 241 A1 | 11/2008 |
| JP | 08-033009 A | 2/1996 |
| JP | 11-313062 A | 11/1999 |
| KR | 10-2007-0021563 A | 2/2007 |
| KR | 10-2007-0073126 A | 7/2007 |
| KR | 10-2008-0074723 A | 8/2008 |
| WO | 2005/076688 A2 | 8/2005 |
| WO | 2007/098676 A1 | 9/2007 |

OTHER PUBLICATIONS

Asustek; Window based mechanism for HARQ stall avoidance; 3GPP TSG-RAN WG2 meeting #26; R2-020082; Jan. 7-11, 2002; Sophia-Antipolis, France.

* cited by examiner

MULTI-FA PERSONAL SUBSCRIBER TERMINAL AND METHOD OF ORDERING PROTOCOL DATA UNIT THEREOF

TECHNICAL FIELD

The present invention relates to a multi-FA personal subscriber terminal and a method of reordering protocol data units thereof. More particularly, the present invention relates to a multi-FA personal subscriber terminal and a method of reordering protocol data units which accesses two frequency channels at the same time for data transmission or reception and appropriately reorders protocol data units (hereinafter, referred to as "PDUs") to be transferred through each of the frequency channels, thereby minimizing errors in transmitting a TCP/IP packet.

BACKGROUND ART

Personal subscriber stations that each simultaneously access a plurality of frequency channels in mobile WiMax, particularly, WiBro (wireless broadband Internet) for data transmission and reception (hereinafter referred to as "multi-FA personal subscriber terminals") have been developed.

In the related art, a technique of allocating a plurality of frequency channels to a specific terminal in a cell and a technique of performing hand-off from a bad frequency channel to a good frequency channel according to a wave propagation environment of a base station are disclosed.

According to the related art, in order to control errors in data, a HARQ (hybrid ARQ) function, which is a method of controlling errors by combining retransmission and error correction, is defined in a physical layer. A packet data service system that generates many packets, e.g., wireless Internet packets, in a short time, that is, that generates packet bursts, can improve a packet processing rate through error control using a HARQ method.

Further, in the related art, TCP (transmission control protocol) is generally used as one of core protocols for transmitting packet data.

As is known, the TCP protocol errorlessly transmits user data from end to end. In order for error correction, the receiving side transmits an ACK (acknowledge) for the received TCP segment. Further, if the transmitting side does not receive the ACK, it performs retransmission and congestion control.

In this case, the TCP transmits the ACK in a cumulative ACK manner. In the cumulative ACK manner, an ACK number represents a bite number of data in a data stream that is received and perceived by the receiving side. In other words, the ACK number represents the next octet number that the transmitting side should transmit.

The cumulative ACK manner should not perform retransmission even though an ACK packet is lost. Therefore, even though one ACK packet is lost during data transmission, all data having been received can be perceived through an ACK for the next data packet.

However, when a data packet is partially lost and then the next packet is received, or when a data packet is not received according to the sequence number of data packets, the receiving side cannot perceive the data packet. Therefore, the transmitting side is required to perform retransmission.

Therefore, in a portable Internet technique, if the HARQ is operated, or if one terminal simultaneously accesses two or more frequency channels for transmitting or receiving data packets, TCP packets are not transmitted according to the sequence number, resulting in decreased transmission efficiency.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a multi-FA personal subscriber station and a method of ordering protocol data units thereof having advantages of simultaneously accessing two frequency channels to transmit and receive data and appropriately ordering protocol data units transmitted through each frequency channel, thereby minimizing errors in TCP/IP packet transmission.

Technical Solution

An exemplary embodiment of the present invention provides a multi-FA personal subscriber terminal including: an ordering unit sequentially aligning first protocol data units received through a first frequency channel and second protocol data units received through a second frequency channel in downlink according to sequence number of each of the first protocol data units and the second protocol data units, generating protocol data unit sequence numbers in uplink, and transmitting them to a low medium access control unit corresponding to frequency channels; and a reassembling unit reassembling the first protocol data units and the second protocol data units ordered in the ordering unit and generating a service data unit.

Another embodiment of the present invention provides a protocol data unit ordering method for a multi-FA personal subscriber terminal, including: designating a frame number to each of a plurality of protocol data units received in an arbitrary sequence from a base station through downlink of a first frequency channel and a second frequency channel; storing at least one protocol data unit, satisfying a protocol data unit sequence queue store condition among the protocol data units, in a protocol data unit sequence queue; and ordering the at least one protocol data unit stored in the protocol data unit sequence queue.

Advantageous Effects

According to the multi-FA personal subscriber terminal and the method of ordering protocol data units thereof according to exemplary embodiments of the present invention, two frequency channels are simultaneously accessed to transmit and receive data and protocol data units transmitted through each of the frequency channels are ordered, thereby minimizing errors in TCP/IP packet transmission.

Further, according to the multi-FA personal subscriber terminal and the method of ordering protocol data units thereof according to exemplary embodiments of the present invention, when a portable Internet terminal operating HARQ error control transmits TCP packets, the packets are sequentially transmitted and received, thereby minimizing retransmission of a TCP layer in a wireless section.

Furthermore, according to the multi-FA personal subscriber terminal and the method of ordering protocol data units thereof according to exemplary embodiments of the present invention, the performance of a portable Internet terminal, which has a function of performing HARQ error control and a function of simultaneously accessing multiple frequency channels, is improved. Therefore, an existing WiBro terminal may have compatibility with the next standards such as 802.16m.

BRIEF DESCRIPTION OF THE DRAWINGS

FIG. 4 is a drawing showing an initial state of the ordering process according to the PDC ordering method according to the exemplary embodiment of the present invention when two frequency channels are simultaneously accessed.

FIG. 5 is a drawing illustrating a case where a 30 PDU is arriving in the ordering process according to the PDU ordering method according to the exemplary embodiment of the present invention when two frequency channels are simultaneously accessed.

FIG. 6 is a drawing illustrating a case where a 31 PDU is arriving in the ordering process according to the PDU ordering method according to the exemplary embodiment of the present invention when two frequency channels are simultaneously accessed.

FIG. 7 is a drawing illustrating a case where a 39 PDU is arriving in the ordering process according to the PDU ordering method according to the exemplary embodiment of the present invention when two frequency channels are simultaneously accessed.

FIG. 8 is a drawing illustrating a case where a 35 PDU is arriving in the ordering process according to the PDU ordering method according to the exemplary embodiment of the present invention when two frequency channels are simultaneously accessed.

FIG. 9 is a drawing illustrating a case where a 38 PDU is arriving in the ordering process according to the PDU ordering method according to the exemplary embodiment of the present invention when two frequency channels are simultaneously accessed.

FIG. 10 is a drawing illustrating a case where a 47 PDU is arriving in the ordering process according to the PDU ordering method according to the exemplary embodiment of the present invention when two frequency channels are simultaneously accessed.

FIG. 11 is a drawing illustrating the final state in the ordering process according to the PDU ordering method according to the exemplary embodiment of the present invention when two frequency channels are simultaneously accessed.

BRIEF EXPLANATION OF REFERENCE NUMERALS

Figure 1:
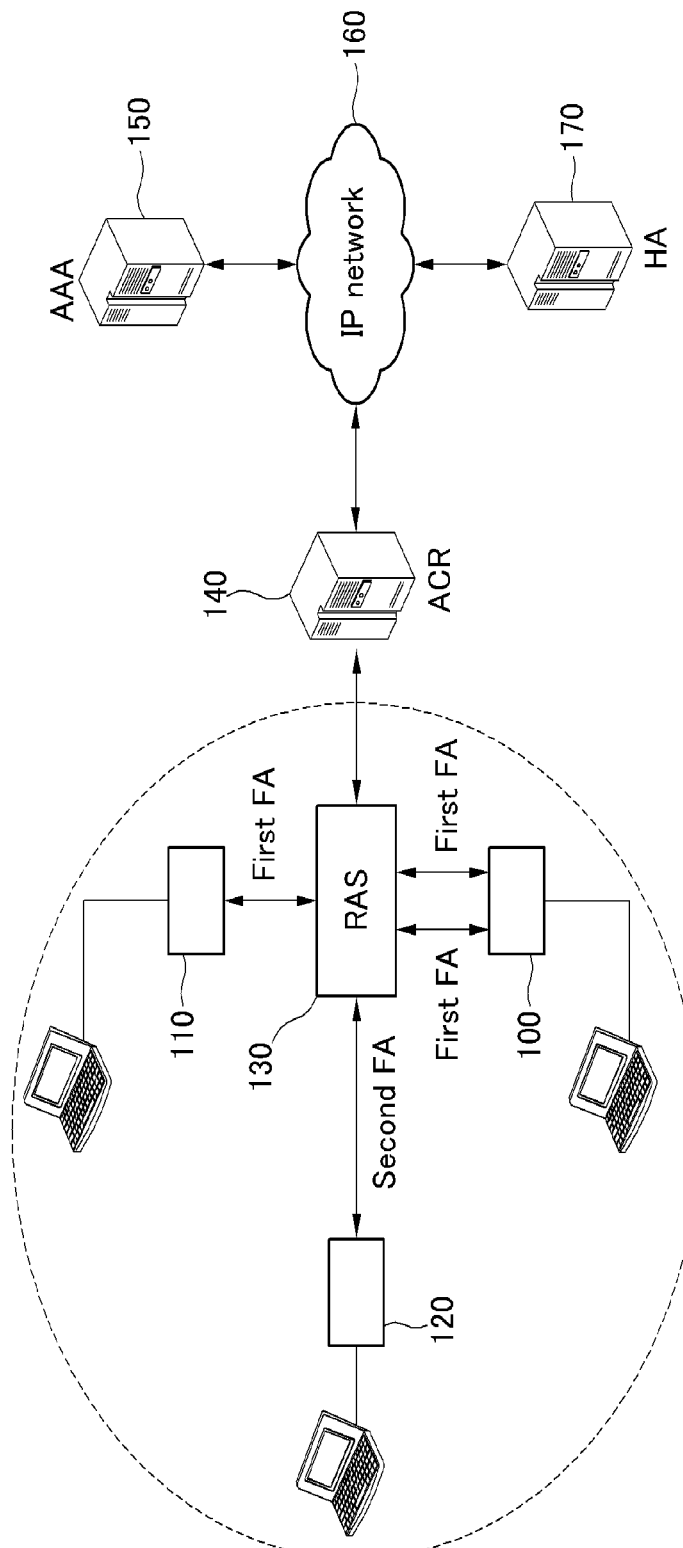
FIG. 1 is a drawing illustrating an example of a portable Internet network supplying a function of accessing multiple frequency channels in one cell.

100, 110, 120 . . . portable terminal
130 . . . base station
140 . . . wireless access control equipment (ACR)
150 . . . authentication server (AAA)
160 . . . IP network
170 . . . home agent (HA) server

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

In the specification, unless explicitly described to the contrary, the word "comprise" and variations such as "comprises" or "comprising" will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In this specification, a mobile station (MS) may designate a terminal, a mobile terminal (MT), a subscriber station (SS), a portable subscriber station (PSS), user equipment (UE), an access terminal (AT), etc., and may include functions of all or a part of a terminal, a mobile terminal, a subscriber station, a portable subscriber station, user equipment, an access terminal, etc.

In this specification, a base station (BS) may represent an access point (AP), a radio access station (RAS), a node B, a base transceiver station (BTS), a mobile multihop relay (MMR)-BS, and the like. Further, the base station may have the entire or partial function of the access point, the radio access station, the node B, the base transceiver station, the MMR-BS, and the like.

FIG. 1 is a drawing illustrating an example of a portable Internet network supplying a function of accessing multiple frequency channels in one cell.

As shown in FIG. 1, in one cell, a radio access station (RAS), that is, a base station 130, may operate a plurality of frequency channels. Further, portable subscriber stations PSS, that is, portable terminals 100, 110, and 120 may access one frequency channel or may simultaneously access a plurality of frequency channels according to the characteristics of the portable terminals, and be operated. The RAS 130 is connected to a wireless access control equipment (ACR) 140; and the ACR 140 is connected to AAA 150 and HA 170 via IP network 160.

In current portable Internets (mobile WiMax), particularly the WiBro network, an operation band of 10 MHz is adopted. However, in 802.16m standards, in addition to 10 MHz, a variable bandwidth of 20 to 40 MHz is defined. Therefore, in order to support high-speed communication in the future, a system corresponding to 20 to 40 MHz should be developed.

Therefore, in order to reflect future technical standards while maintaining compatibility with a current system corresponding to 10 MHz, as shown in FIG. 1, in one cell, all of a terminal 110 accessing a band of 10 MHz, a terminal 120 accessing a band of 20 MHz, and a terminal 100 simultaneously accessing two bands with bandwidths of 10 MHz should operate.

In other words, the portable terminal 110 accesses a first frequency band, for example a band of 10 MHz, to transmit and receive data, and the portable terminal 120 accesses a second frequency band that is different from the first frequency bandwidth, for example a band of 20 MHz, to transmit and receive data. The portable terminal 100 simultaneously accesses a plurality of first frequency channels to transmit and receive data. An exemplary embodiment of the present invention relates to the portable terminal 100 and an operating method thereof.

Figure 2:
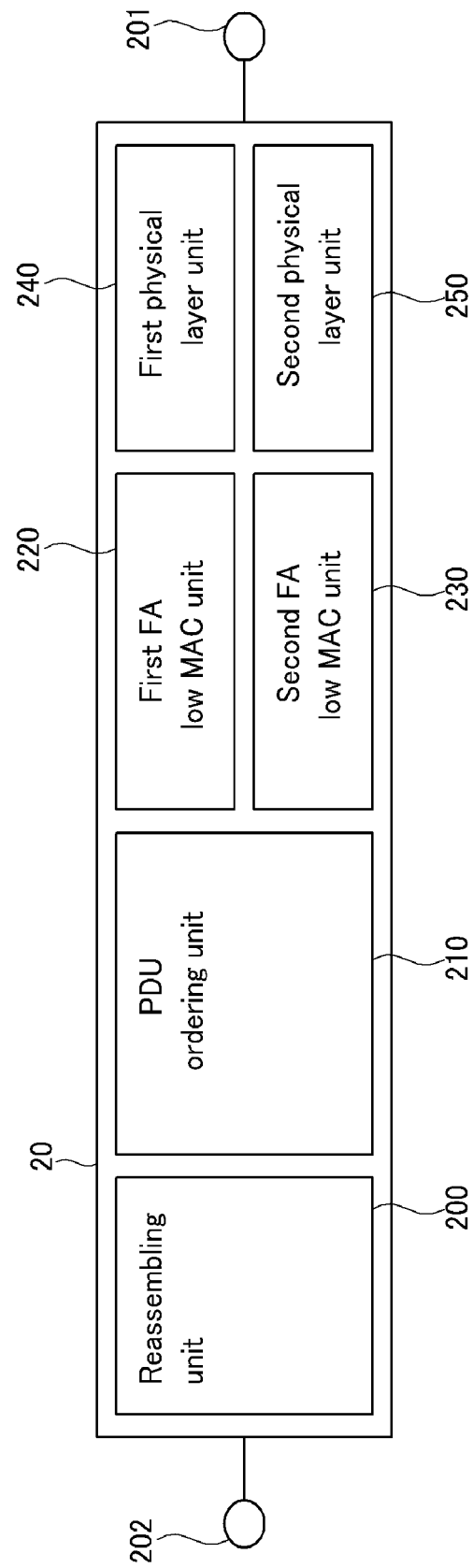
FIG. 2 is a block diagram illustrating an example of a multi-FA personal subscriber terminal according to an exemplary embodiment of the present invention.

FIG. 2 is a block diagram illustrating an example of a multi-FA personal subscriber terminal according to an exemplary embodiment of the present invention.

FIG. 2 shows a terminal simultaneously accessing two frequency channels according to an exemplary embodiment.

As shown in FIG. 2, a multi-FA personal subscriber terminal 20 according to an exemplary embodiment of the present invention includes a reassembling unit 200, a PDU ordering unit 210, a first FA low MAC unit 220, a second FA low MAC unit 230, a first physical layer unit 240, and a second physical layer unit 250.

Further, the multi-FA personal subscriber terminal 20 according to the exemplary embodiment of the present invention is connected to an apparatus such as a laptop computer that has a TCP/IP layer and can execute an Internet application program, through an interface 202 such as a USB or PCMCIA. Further, the multi-FA personal subscriber terminal is connected to a base station through a wireless interface 201 and is connected to the Internet.

Referring to FIG. 2, the components of the multi-FA personal subscriber terminal 20 are described in detail.

The reassembling unit 200 classifies inflow packets from a terminal end system (for example a laptop computer) through the interface 202, determines whether the packet flow is a service flow requiring a new QoS (quality of service), and requests to set a new connection between the terminal and a MAC (medium access control) layer of a base station.

If the connection is set, the reassembling unit 200 classifies inflow TCP packets from the terminal end system, divides the packets according to the conditions of radio resources to generate protocol data units (referred to as PDU), and transmits the PDUs to the PDU ordering unit 210. Meanwhile, if receiving PAC PDUs from the PDU ordering unit 210, the reassembling unit reassembles the PAC PDUs to generate TCP packets, and transmits the TCP packets to the terminal end system.

If receiving downlink MAC PDUs from a plurality of low MAC units corresponding to a plurality of channels, the PDU ordering unit 210 aligns the PDUs according to the number sequence thereof and transmits the PDUs to the reassembling unit 200. Further, if receiving uplink MAC PDUs from the reassembling unit 200, the PDU ordering unit generates MAC PDU numbers and transmits them to the low MAC units corresponding to the frequency channels. In this case, the uplink PDUs are transmitted to mutually different frequency channels according to radio resource policies allocated by the base station. Meanwhile, in the exemplary embodiment shown in FIG. 2, two frequency channels are simultaneously accessed, and thus two low MAC units 220 and 230 and two physical layer units 240 and 250 are included in the portable terminal 20.

The first FA low MAC unit 220 and the second FA low MAC unit 230 analyze uplink and downlink MAPs in every frame transmitted from the base station, and control the physical layer units 240 and 250 corresponding to individual frequency channels according to the analyzed MAPs. Further, the low MAC units receives downlink PDU bursts from the base station through the physical layer units 240 and 250 and transmit them to the PDU ordering unit 210. Furthermore, the low MAC units receive uplink PDU bursts from the PDU ordering unit 210 and transmit them to the physical layer units 240 and 250.

Meanwhile, since the portable Internet, particularly WiBro, adopts an OFDM/TDMA scheme, every frame is divided into an uplink section and a downlink section. The base station transmits data to each terminal through the downlink section, and each terminal perceives and receives data corresponding to the corresponding terminal through MAP data (downlink MAP data) transmitted in the beginning of each section.

Figure 3:
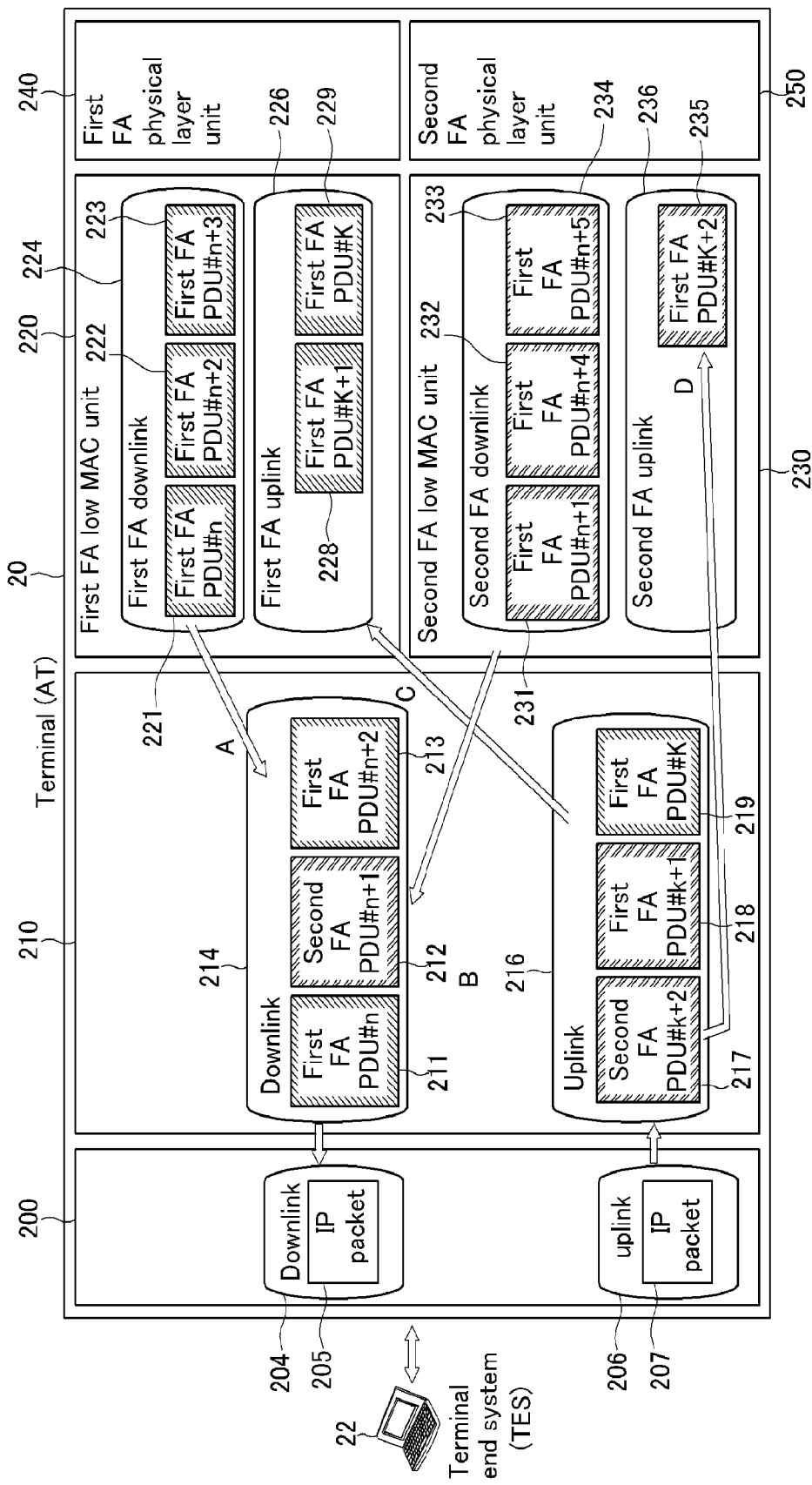
FIG. 3 is a drawing illustrating an example of the operation of the multi-FA personal subscriber terminal shown in FIG. 2.

FIG. 3 is a drawing illustrating an example of the operation of the multi-FA personal subscriber terminal shown in FIG. 2.

The exemplary embodiment shown in FIG. 3 relates to a portable terminal simultaneously accessing two frequency channels among multi-FA personal subscriber terminals.

If a new connection is set between the portable terminal 20 and the base station, the reassembling unit 200 classifies TCP packets 207 of inflow uplink 206 from a terminal end system 22, divides the packets according to the conditions of the radio resources to generate protocol data unit (PDU) bursts 216, and transmits them to the PDU ordering unit 210. Meanwhile, if receiving downlink MAC PDUs 214 from the PDU ordering unit 210, the reassembling unit reassembles them to generate TCP packets 205 of downlink 204, and transmits them to the terminal end system 22.

If receiving MAC PDUs 224 of the first FA downlink from the first FA low MAC unit 220 and MAC PDUs 234 of the second FA downlink from the second FA low MAC unit 230, the PDU ordering unit 210 aligns PDUs 211, 212, 213, 221, 222, 223, 231, 232, and 233 in the number order and transmits them to the reassembling unit 200. Further, if receiving uplink MAC PDUs 216 from the reassembling unit 200, the PDU ordering unit generates MAC PDU numbers 217, 218, 219 of uplink 216, MAC PDU numbers 228, 229 of first FA uplink 226, and MAC PDU number 235 of second FA uplink 236 and transmits them to the first low MAC unit 220 and the second low MAC unit 230. In this case, it is determined whether to transmit each of the uplink PDUs to the first low MAC unit 220 or to the second low MAC unit 230 according to radio resource policies allocated by the base station.

As shown in FIG. 3, according to a PDU ordering process of a multi-FA personal subscriber terminal according to an exemplary embodiment of the present invention, since TCP packets are always sequentially aligned, it is possible to cope with a problem in which TCP packets are out of order when HARP error control is performed in a physical layer according to the related art.

FIGS. 4 to 11 are drawings illustrating sequential states of an ordering process according to a PDU ordering method according to an exemplary embodiment of the present invention when two frequency channels are simultaneously accessed.

First, some terms are defined in the following Table 1.

TABLE 1

| Term | Definition |
| --- | --- |
| Current frame(current_frame) | Frame number transmitted in MAP in a TDD mode (it is assumed the frame number is periodically updated in an FDD mode) |
| Start sequence(start seq) | PDU sequence number of PDU to be transmitted next to reassembly and CS transmission units as a value from the current fame in MAX_FRAME_WINDOW |
| Maximum sequence number(MAX_SEQ_NUM) | A range of maximum PDU sequence number capable of being aligned in a PDU ordering unit (for error control) |
| Start frame(start frame) | The frame number of a PDU having the maximum difference from the current frame value and being used for reordering timeout |
| frame range(frame_win) | A range between the current frame and the start frame |
| maximum frame range(MAX_FRAME_WINDOW) | The maximum time range capable of being aligned from the current fame in the PDU ordering unit |

Figure 4:
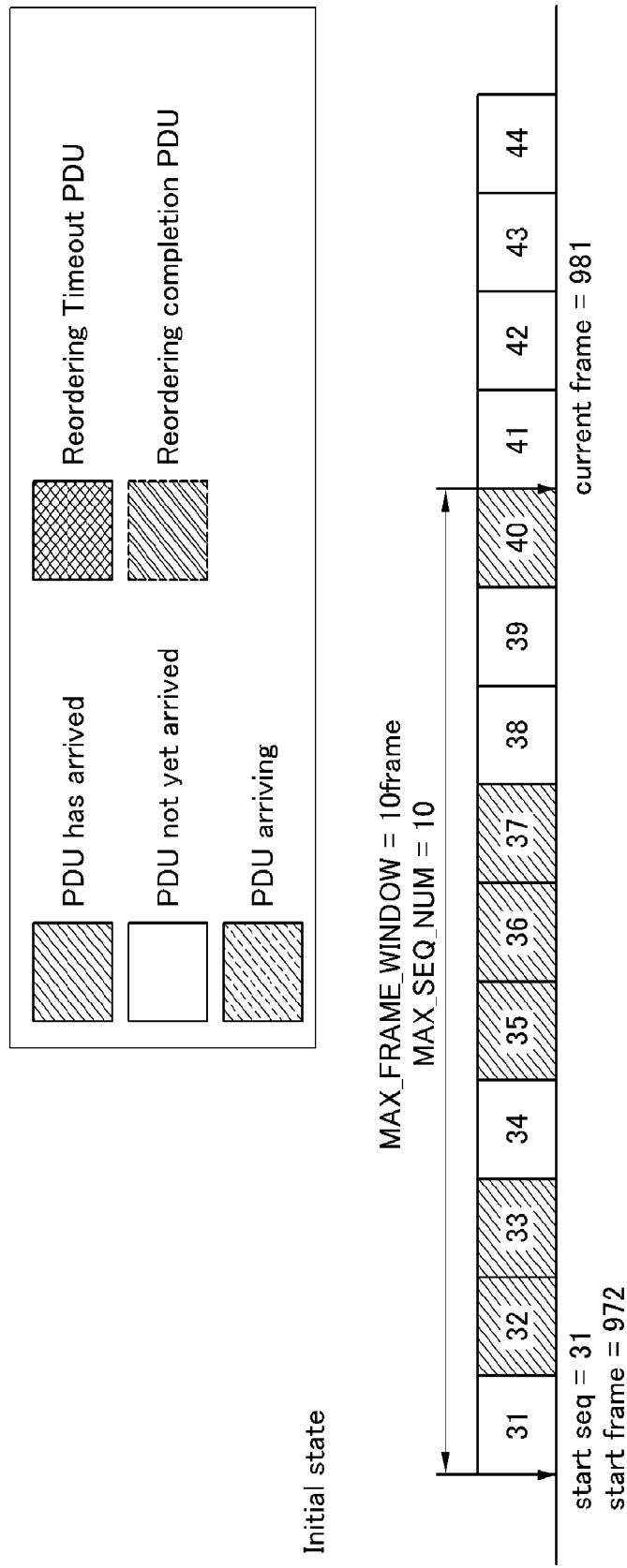
FIGS. 4 to 11 are drawings illustrating sequential states of an ordering process according to a PDU ordering method according to an exemplary embodiment of the present invention when two frequency channels are simultaneously accessed.

FIG. 4 is a drawing showing an initial state of the ordering process according to the PDC ordering method according to the exemplary embodiment of the present invention when two frequency channels are simultaneously accessed.

As shown in FIG. 4, PDUs having received the receiving side have PDU sequence numbers and are given with received frame numbers (current frame number=981). The current frame number is a timer that is periodically updated and is broadcasted each frame in MAP in a TDD (time division duplex) mode, or periodically updated in a FDD (frequency division duplex) mode.

In FIG. 4, as an example, the current frame number sequentially increases from 981 by 1 every frame. For PDU ordering, the individual PDUs wait from the current frame number to the maximum frame range or a time range that is narrower than the maximum frame range. If ordering is not performed during that range, the PDUs are directly transmitted to the reassembling unit.

Therefore, a maximum stand-by time period when the PDUs stands by in the PDU ordering unit is obtained by the Equation of Math FIG. 1.

(Maximum Stand-by Time)=(Maximum Frame Range)*(1 Frame Range)     [Math Figure 1]

For example, if 1 frame range (frame duration) is 5 ms, in the case of FIG. 4, the maximum stand-by time becomes 50 ms (=10*5 (ms)).

Figure 5:
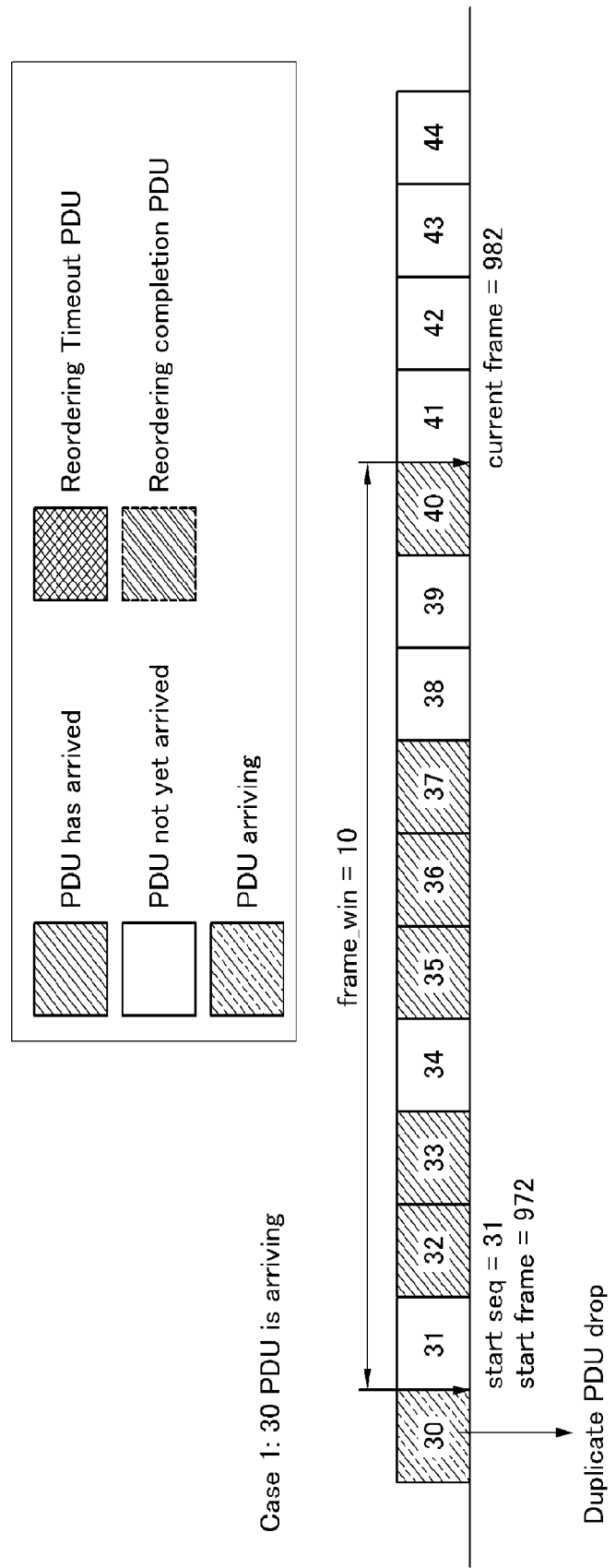

FIG. 5 is a drawing illustrating a case where a 30 PDU is arriving in the ordering process according to the PDU ordering method according to the exemplary embodiment of the present invention when two frequency channels are simultaneously accessed.

The next PDU sequence number to be transmitted to the PDU ordering unit is determined according to the start sequence (start seq), and a PDU having the smallest frame number in the current frame in the maximum frame range MAX_FRAME_WINDOW becomes the start frame. Therefore, the start sequence number and the number of the start frame may be equal to each other or may be different from each other. Further, the maximum number of packets from the start sequence number that is capable of being processed by the PDU ordering unit is expressed as a maximum sequence number MAX_SEQ_NUM. Any PDU out of that range is disregarded.

In FIG. 5, when the 982-nd frame is the current frame and a 30 PDU is arriving, the PDU exceeds the maximum sequence number and is thus disregarded.

Figure 6:
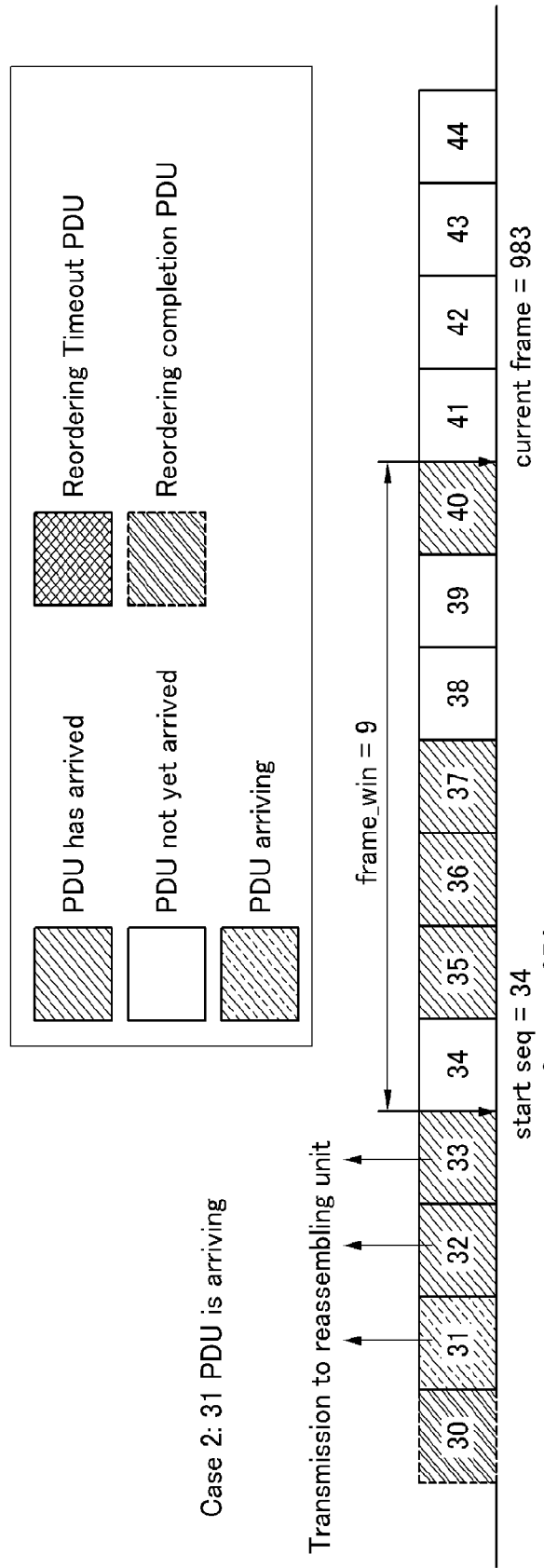

FIG. 6 is a drawing illustrating a case where a 31 PDU is arriving in the ordering process according to the PDU ordering method according to the exemplary embodiment of the present invention when two frequency channels are simultaneously accessed.

When the 983-rd frame is the current frame and the 31 PDU is arriving, since the 31 PDU corresponds to the start sequence, the 31 PDU is transmitted to the reassembling unit, and simultaneously the start sequence is updated with 34. In this case, the start frame is updated with a frame number having the maximum difference from the current frame in the PDU ordering unit.

Figure 7:
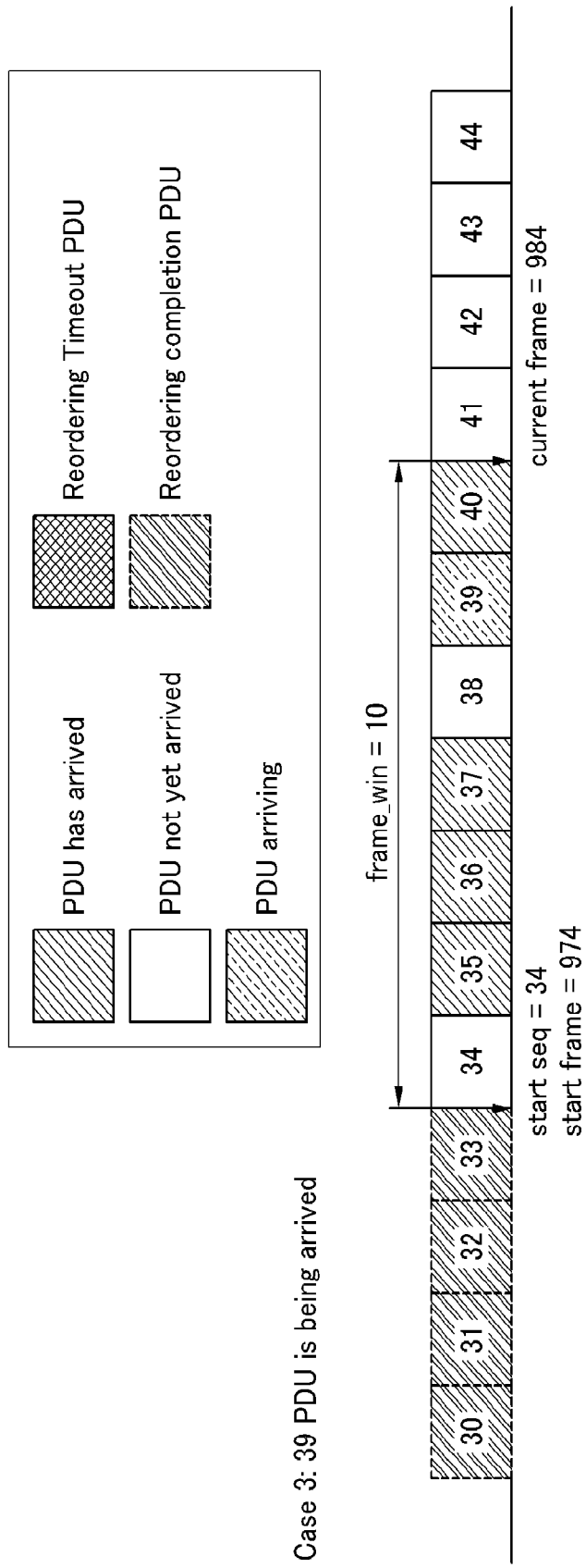

FIG. 7 is a drawing illustrating a case where a 39 PDU is arriving in the ordering process according to the PDU ordering method according to the exemplary embodiment of the present invention when two frequency channels are simultaneously accessed.

In FIG. 7, since the 984-th frame is the current frame, when the 39 PDU is arriving, it is aligned and stored in a PDU sequence queue. Further, since the number of the PDU is not the start sequence number and the current frame range is less than 10, there is no change.

Figure 8:
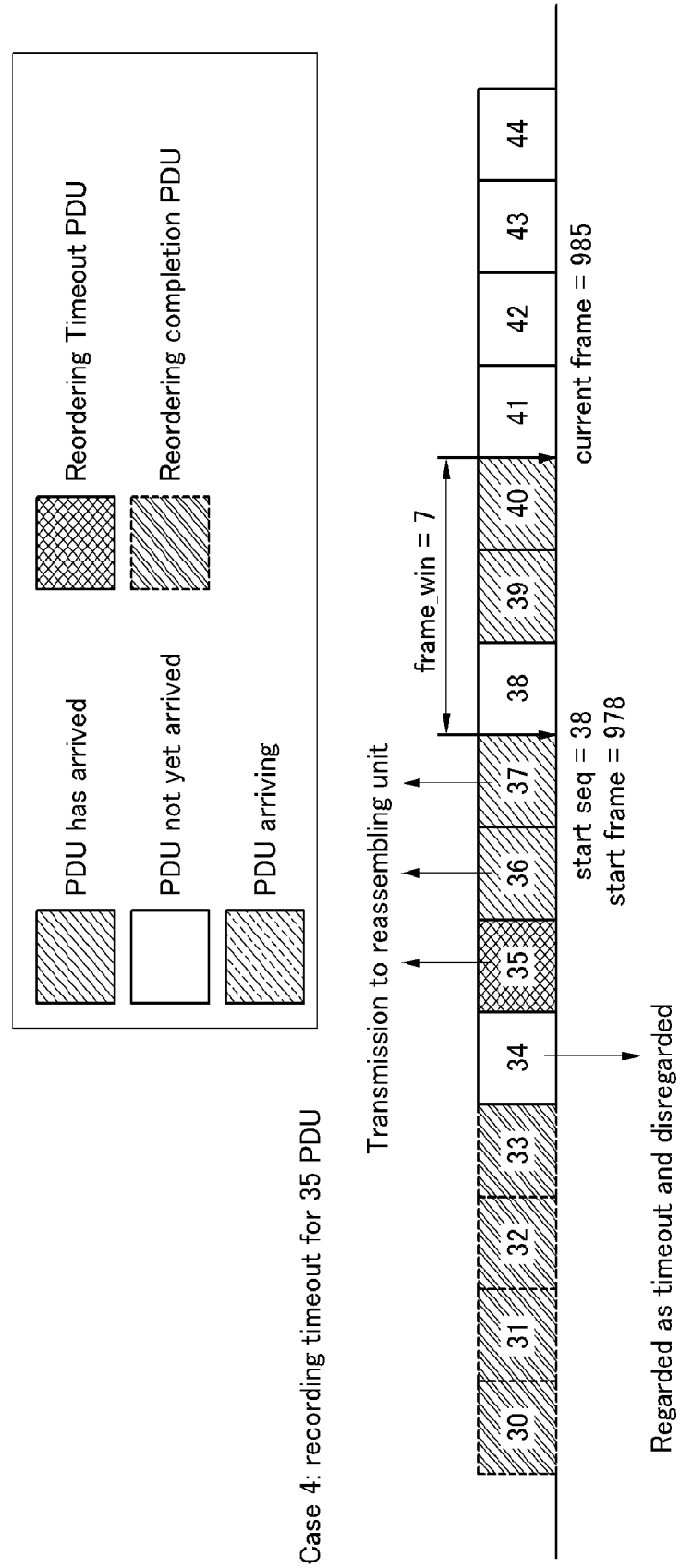

FIG. 8 is a drawing illustrating a case where a 35 PDU is arriving in the ordering process according to the PDU ordering method according to the exemplary embodiment of the present invention when two frequency channels are simultaneously accessed.

In FIG. 8, when the 985-th frame is the current frame and ordering timeout for a 35 PDU occurs, the start sequence number increases to 36 and the 35 PDU is transmitted to the reassembling unit. Next, 36 and 37 PDUs having arrived also are transmitted to the reassembling unit and the start sequence sequentially increases by 1 up to 38. Meanwhile, the start frame is updated with a frame number having the maximum difference from the current frame in the PDU ordering unit. In consequence, as shown in FIG. 8, the current frame becomes the 985-th frame, and the frame range becomes 7.

Figure 9:
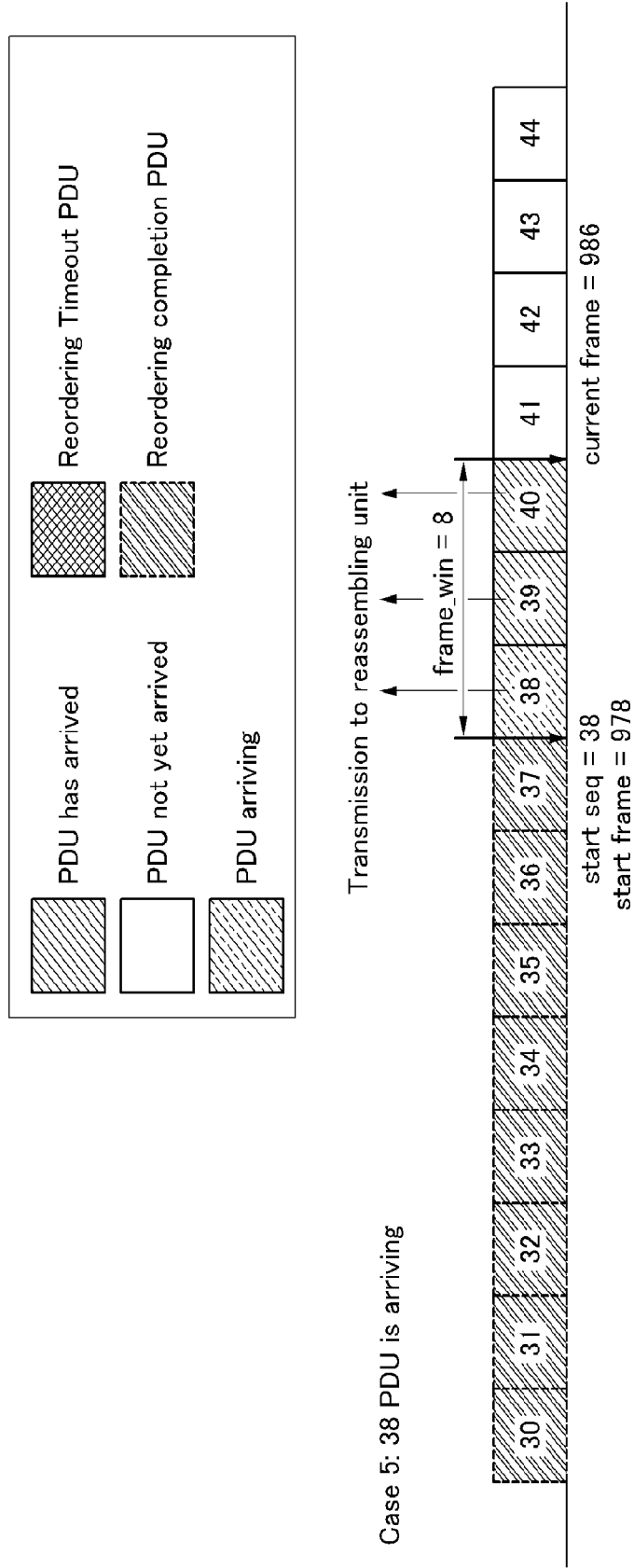

FIG. 9 is a drawing illustrating a case where a 38 PDU is arriving in the ordering process according to the PDU ordering method according to the exemplary embodiment of the present invention when two frequency channels are simultaneously accessed.

In FIG. 9, when the 986-th frame becomes the current frame and the 38 PDU is arriving, since the 38 PDU is not a PDU corresponding to the start sequence, the 38 PDU is transmitted to the reassembling unit and the start sequence number increases to 39. Further, since 39 and 40 PDUs have already arrived, the 39 and 40 PDU also are transmitted to the reassembling unit, and the start sequence is updated with 41 (=39+2).

Meanwhile, in the case of FIG. 9, no more PDUs arrive and thus the frame range becomes 0.

Figure 10:
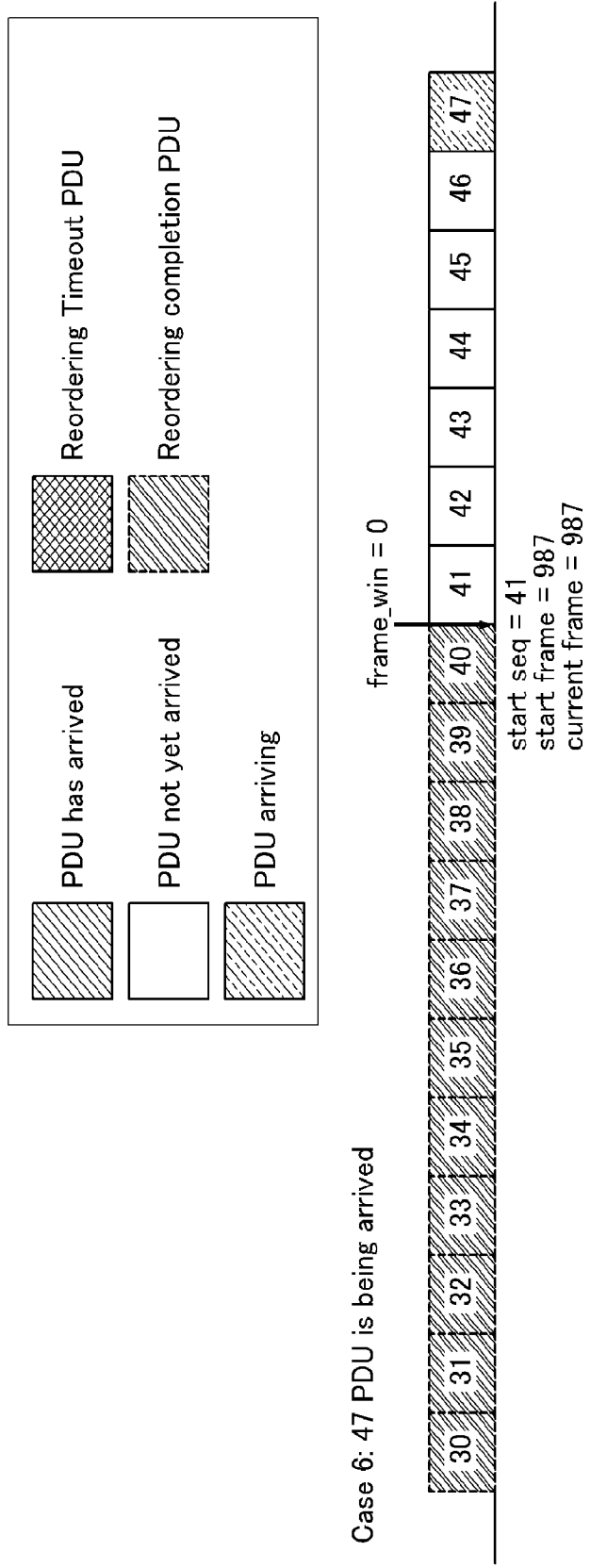

FIG. 10 is a drawing illustrating a case where a 47 PDU is arriving in the ordering process according to the PDU ordering method according to the exemplary embodiment of the present invention when two frequency channels are simultaneously accessed.

In FIG. 10, when the 987-th frame is the current frame and the 47 PDU is arriving, the frame range becomes 1.

Figure 11:
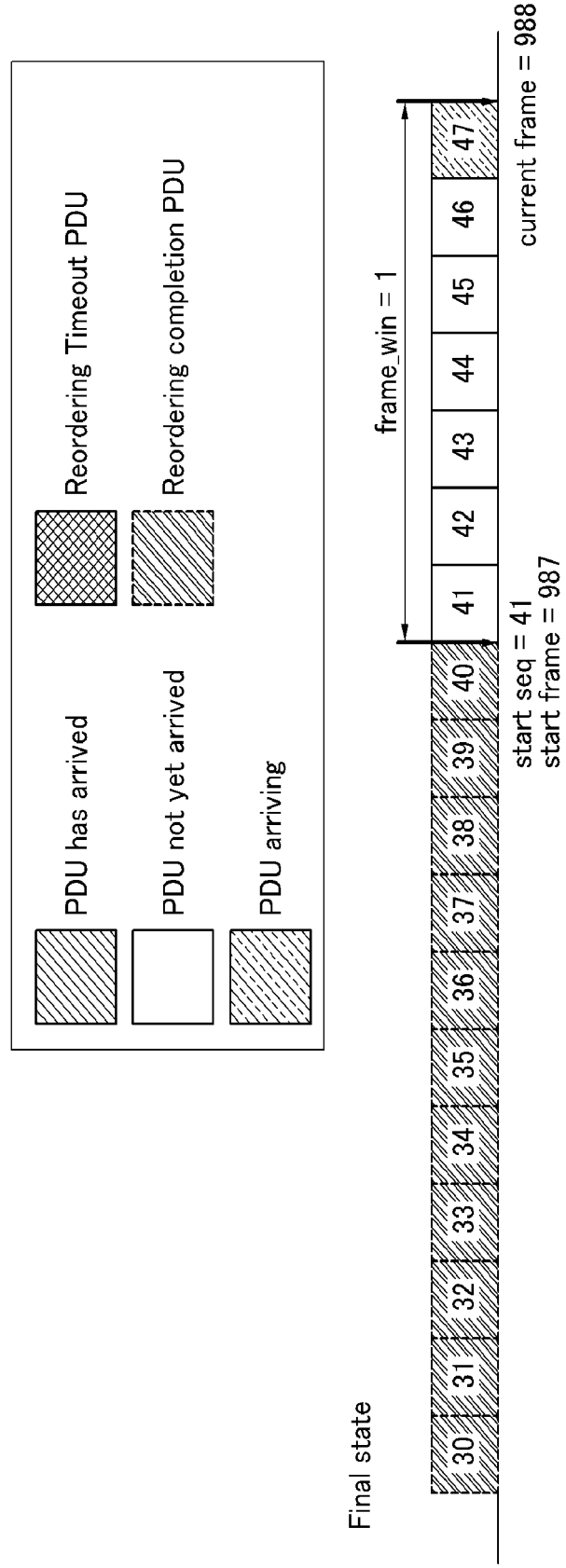

FIG. 11 is a drawing illustrating the final state in the ordering process according to the PDU ordering method according to the exemplary embodiment of the present invention when two frequency channels are simultaneously accessed.

As shown in FIG. 11, it can be seen that ordering on 30 to 40 PDUs has been completed after the ordering process shown in FIG. 4 to FIG. 10 had been performed. Further, it can be seen that 41 to 46 PDUs have not yet arrived and the start sequence indicates 41.

Figure 12:
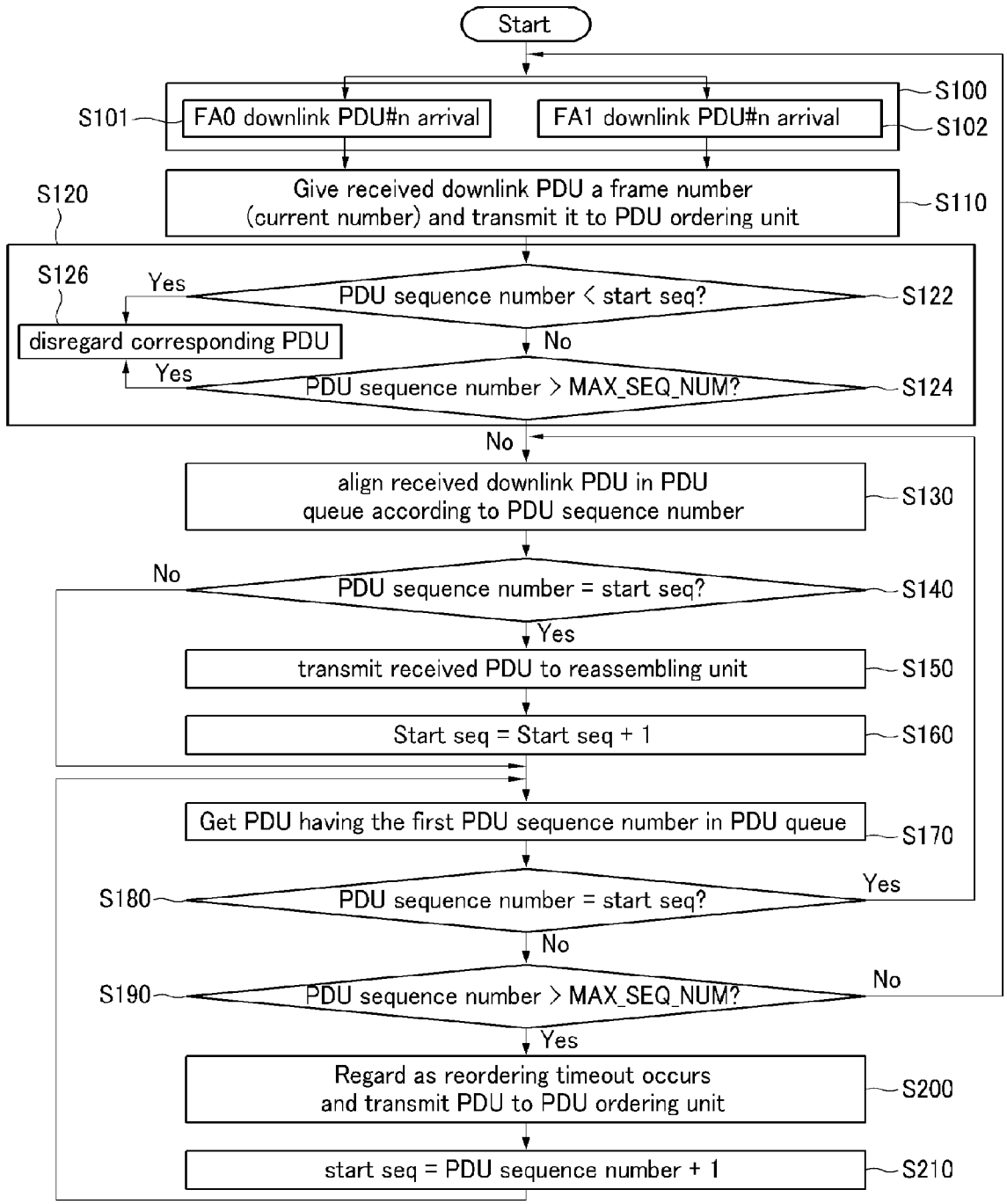
FIG. 12 is a flowchart illustrating an example of a PDU ordering method in downlink when two frequency channels are simultaneously accessed according to an exemplary embodiment of the present invention.

FIG. 12 is a flowchart illustrating an example of a PDU ordering method in downlink when two frequency channels are simultaneously accessed according to an exemplary embodiment of the present invention.

For explanation of the flowchart shown in FIG. 12, it is assumed that a terminal simultaneously accesses two frequency channels, and one of the two frequency channels is referred to as a first frequency channel FA0. Further, the other of the two frequency channels simultaneously accessed by the terminal is referred to as a second frequency channel FA1.

First, PDUs are received to downlink low MAC units and physical layer units in an arbitrary sequence through the first frequency channel FA0 or the second frequency channel FA1 (S100). In other words, PDUs are received to downlink the first low MAC unit and the first physical layer unit through the first frequency channel (S101), and PDUs are received to download the second low MAC unit and the second physical layer unit through the second frequency channel (S102). In this case, the first low MAC unit and the second low MAC unit transmits the received PDUs to the PDU ordering unit, and the PDU ordering unit stores the value of the current frame as the frame number for each PDU (S110).

Next, the PDU ordering unit extracts a PDU sequence number (existing in SDU_SN extended subheader of MAC PDU in case of WiBro), and compares it with the start sequence number and the maximum sequence number (S120). If the PDU sequence number is smaller than the start sequence number (S122), or if the PDU sequence number is larger than the maximum sequence number (S124), a corresponding PDU is disregarded (S126). If the PDU sequence number is equal to or larger than the start sequence number, or if the PDU sequence number is equal to or smaller than the maximum sequence number, the corresponding PDU is aligned and stored in a PDU sequence queue according to the sequence number (S130).

Next, the PDU ordering unit determines whether the sequence number of the PDU is equal to the start sequence number (S140). If the sequence number of the PDU is equal to the start sequence number, the received corresponding PDU is directly transmitted to the reassembling unit (S150). At the same time, the start sequence number increases by 1 (S160).

If at least one PDU is stored in the PDU sequence queue, the PDU ordering unit gets the next PDU (S170), and determines whether the sequence number of the corresponding PDU is equal to the start sequence number (S180).

If the sequence number of the PDU is equal to the start sequence number and any more PDU remains in the PDU sequence queue, as shown in FIG. 12, the above-mentioned processes are repeatedly performed on the remaining PDUs. If the sequence number of the PDU is different from the start sequence number, as shown in FIG. 12, the procedure proceeds to the next process (S180).

The PDU ordering unit periodically increases the current frame every frame, and extracts the current frame and a specific PDU (of which the difference is larger than the maximum frame range) from the PDUs aligned and stored in the PDU ordering unit (S190).

If the specific PDU is extracted, after reordering timeout occurs, the corresponding PDU is transmitted to the reassembling unit (S200). At this time, the start sequence number increases to a value obtained by adding 1 to the start sequence number of the PDU (S210).

The PDU ordering process may be omitted when a MAC automatic repeat request function is enabled.

Further, a base station can perceive information on whether a specific terminal supports an ordering function when SBC_REQ (SS basic capability request) and SBC-RSP (SS basic capability response) messages are exchanged between the terminal and the base station.

In this case, a MAC PDU sequence number used for PDU ordering basically uses a PDU_SN extended subheader defined in standards. Meanwhile, in order to minimize overhead, a fragment subheader may be used.

Further, PDU ordering in one terminal may be performed in a connection unit.

The above-mentioned exemplary embodiments of the present invention are not only embodied by a method and apparatus. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A protocol data unit ordering method for a multi-FA personal subscriber terminal, comprising: designating a frame number to each of a plurality of protocol data units received in an arbitrary sequence from a base station through downlink of a first frequency channel and a second frequency channel; storing at least one protocol data unit, satisfying a protocol data unit sequence queue store condition among the protocol data units, in a protocol data unit sequence queue; and ordering the at least one protocol data unit stored in the protocol data unit sequence queue, wherein in storing in the protocol data unit sequence queue, if a sequence number of a protocol data unit is equal to or larger than a start sequence number and is smaller than a maximum sequence number, it is determined that the protocol data unit satisfies the protocol data unit sequence queue store condition.

2. The protocol data unit ordering method of claim 1, wherein the ordering of the at least one protocol data unit comprises storing the protocol data unit in the protocol data unit sequence queue when the sequence number of the protocol data unit is not equal to the start sequence number.

3. The protocol data unit ordering method of claim 2, wherein the ordering of the at least one protocol data unit further comprises transmitting the protocol data unit to a reassembling unit and increasing the start sequence number by 1 when the sequence number of the protocol data unit is equal to the start sequence number.

4. The protocol data unit ordering method of claim 3, further comprising: with respect to each of the protocol data units stored in the at least one protocol data unit, determining whether the sequence number of the protocol data unit stored in the corresponding protocol data unit is equal to the start sequence number; and if the sequence number is equal to the start sequence number, transmitting the protocol data unit stored in the protocol data unit to the reassembling unit and increasing the start sequence number by 1.

5. The protocol data unit ordering method of claim 4, further comprising sequentially increasing the frame number by 1 every frame.

6. The protocol data unit ordering method of claim 5, further comprising: if the frame number of the protocol data unit stored in at least one protocol data unit exceeds a maximum frame range, transmitting the protocol data unit to the reassembling unit and updating the start sequence number with a value obtained by adding 1 to the sequence number of the protocol data unit.

\* \* \* \* \*